(No Model.)

H. H. TRENOR.
TOOL HEAD AND HANDLE.

No. 303,766. Patented Aug. 19, 1884.

Attest:
Henry Theberath.
L. Lee.

Inventor.
H. H. Trenor, per
Thos. S. Crane, Atty.

UNITED STATES PATENT OFFICE.

HENRY H. TRENOR, OF NEW YORK, N. Y.

TOOL HEAD AND HANDLE.

SPECIFICATION forming part of Letters Patent No. 303,766, dated August 19, 1884.

Application filed November 24, 1883. (No model.)

*To all whom it may concern:*

Be it known that I, H. H. TRENOR, a citizen of the United States, residing in the city, county, and State of New York, have invented certain new and useful Improvements in Axes, fully described and represented in the following specification and the accompanying drawings, forming a part of the same.

My invention consists in the combination, with an ax or hatchet head, of a taper-eye, made largest at the outer side, a projecting flange around the inner side of the eye, and a handle having the butt enlarged to retain it in the workman's hand, and having the butt flattened at the sides sufficiently to pass through the eye in the head.

Figure 1:
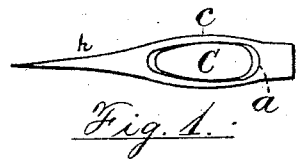
Figure 2:
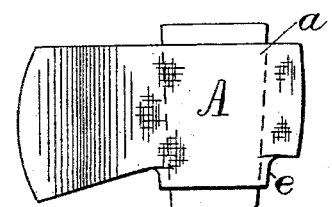
Figure 5:
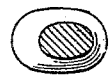
Figure 4:
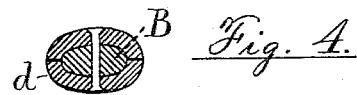
Figure 6:
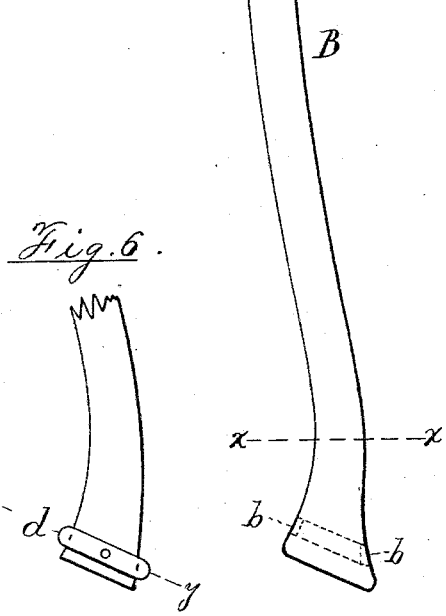
Figure 3:

My invention will be understood by reference to the annexed drawings, in which Figure 1 is a plan of an ax-head embodying my invention. Fig. 2 is a side view of such an ax provided with the handle claimed in combination herein, and Fig. 3 is a section of the handle on line $x\,x$ in Fig. 2. Fig. 4 is a section of the handle through the collar on line $y\,y$. Fig. 5 is a sectional view of an ordinary handle for comparison with my improved form in Fig. 3. Fig. 6 is an alternative construction for the butt of the handle.

In previous constructions the enlargement at the butt of the handle has either been sacrificed to insert the handle through the eye, or the latter, as in United States Patents Nos. 119,807 and 274,414, has been made larger than the head of the handle, and has required filling-wedges to be inserted in the eye at one side of the head after the latter was pushed into the eye from the lower side. My invention enables me to insert the handle into the eye from the upper side, and to make it self-wedging, thus dispensing with such separate attachments, and without sacrificing the utility of the butt in retaining the tool in the workman's hands.

In the drawings, A is the ax-head, B the handle, and C the eye, as shown in the connected view in Fig. 1. The eye C is made of taper form, largest upon the side opposite the projection of the handle, as at $a$, and is so proportioned that the entire handle and butt may pass through its smallest part, the butt and eye being peculiarly shaped to secure such a result. To insert the handle through such an eye requires a material modification of the shape usually given to the butt of the handle, and which shape is indicated in Fig. 5. As shown in that figure, the butt has been constructed with a knob, intended to retain the handle in the fist of the user when at work, and such a handle could not therefore be passed through the eye by the butt-end first, as required in my invention, without greatly enlarging the ordinary eye, and thus deforming the head of the ax irreparably. To avoid such deformity I modify the butt of the handle by flattening its sides, at the same time extending the heel and toe of the butt sufficiently, as shown in Fig. 2, to compensate for such flattening and secure a proper hold for the user. The eye C may thus be kept within the desired limits as to width, while its extension lengthwise to accommodate the heel and toe of the handle is not at all objectionable, as an increase of width would be. By this construction I am enabled to insert the butt of the handle through the eye without altering either injuriously as to its other functions.

To maintain the grip upon the handle when in use, the latter may be indented at the heel and toe of the butt, and provided with a band or collar, as at $d$, the same being formed in halves for application to the handle, and secured at the end of the butt by a screw-pin or rivet, if made of metal. The band may, however, be made of other material, as india-rubber, and stretched over the end of the handle. Such a band may be kept more securely in place by notching around the handle, as indicated at the lines, as at $b$ in Fig. 2. To afford an eye of dimensions suitable to receive a very strong handle, the sides of the ax-head are necessarily swelled out somewhat around the socket, as at $c$ in Fig. 1. Such swell secures a shape much desired, and only partially secured in the heads made heretofore, and called "ridge-bit" or "beveled axes." The shape referred to is a concave or hollow at each side between the eye and the cutting-edge, as at $h$ in Fig. 1, and which is said to be very effective in throwing out the chips cut by the ax. This shape is sometime secured in part by grinding out the cheeks, as at g in Fig. 5; but in my construction it results naturally from the enlargement of the eye, and may be formed in the dies employed for shaping the ax-poles when forged, thus avoiding the excessive grinding. With handles of ordinary size and strength the eye may be so proportioned as to avoid much of such swell, and the cheeks then be made of the ordinary shape. As a violent strain is exerted upon the handle transversely, near the lower side of the head, when the cutting-edge is accidentally jammed in a crack and requires much wrenching to remove it, the handle is most commonly broken at that point, and is often prematurely weakened by pressing against the sides of the eye at the bottom, where it is common to form a pointed projection, nominally to strengthen the eye at such point. To really support the handle at this spot, where it is strained the most, and to increase the wearing-surface in the socket, I form a flange around the eye upon the lower side of the head, as shown at e in Fig. 2, and secure, in combination with the tapering-socket, a much stronger union between the head and handle than has been known heretofore.

A very great saving in cost of production is secured by dispensing with the fastening-wedges heretofore employed, and with the labor of fitting and wedging the handles when this is done in the shop where the tools are made. By my method of manufacture the handles are made interchangeable with the heads. They require no fitting in the factory to one another, and can be boxed and shipped at much less cost, because occupying less space when packed apart from one another. The handle can be inserted by the dealer without any tools, and can be replaced by the user with equal facility when broken.

I am aware of United States Patents No. 119,807, of 1871, and No. 274,414, of 1883, in which handles are inserted into tapering eyes from the lower side next the butt, and are secured in place by metallic keys; and I entirely disclaim all such constructions. I am also aware of German Patent No. 12,136, of June 6, 1880, issued to G. U. Prior, for a compound tool having a pick and ax fitted by a taper-socket at one end of a handle, and having a spade fitted by a tubular socket to the other end of the handle. Such construction does not contain a handle having an enlarged butt; and as the chief object of my invention is to secure such a butt in combination with a taper-eye, I entirely disclaim the said patent.

I have not claimed the improved handle separately herein, as I have filed another patent application in which to prosecute such claim.

I claim the particular construction I have devised in the following manner:

The combination, with the head A, eye C, and handle B, constructed as herein shown and described, of the flange e, formed upon the lower side of the eye, as set forth, and embracing the handle at the smallest part of the taper head, substantially as and for the purpose set forth.

In testimony whereof I have hereunto set my hand in the presence of two subscribing witnesses.

HENRY H. TRENOR.

Witnesses:
CHAS. C. HERRICK,
THOS. S. CRANE.